Patented Jan. 15, 1924.

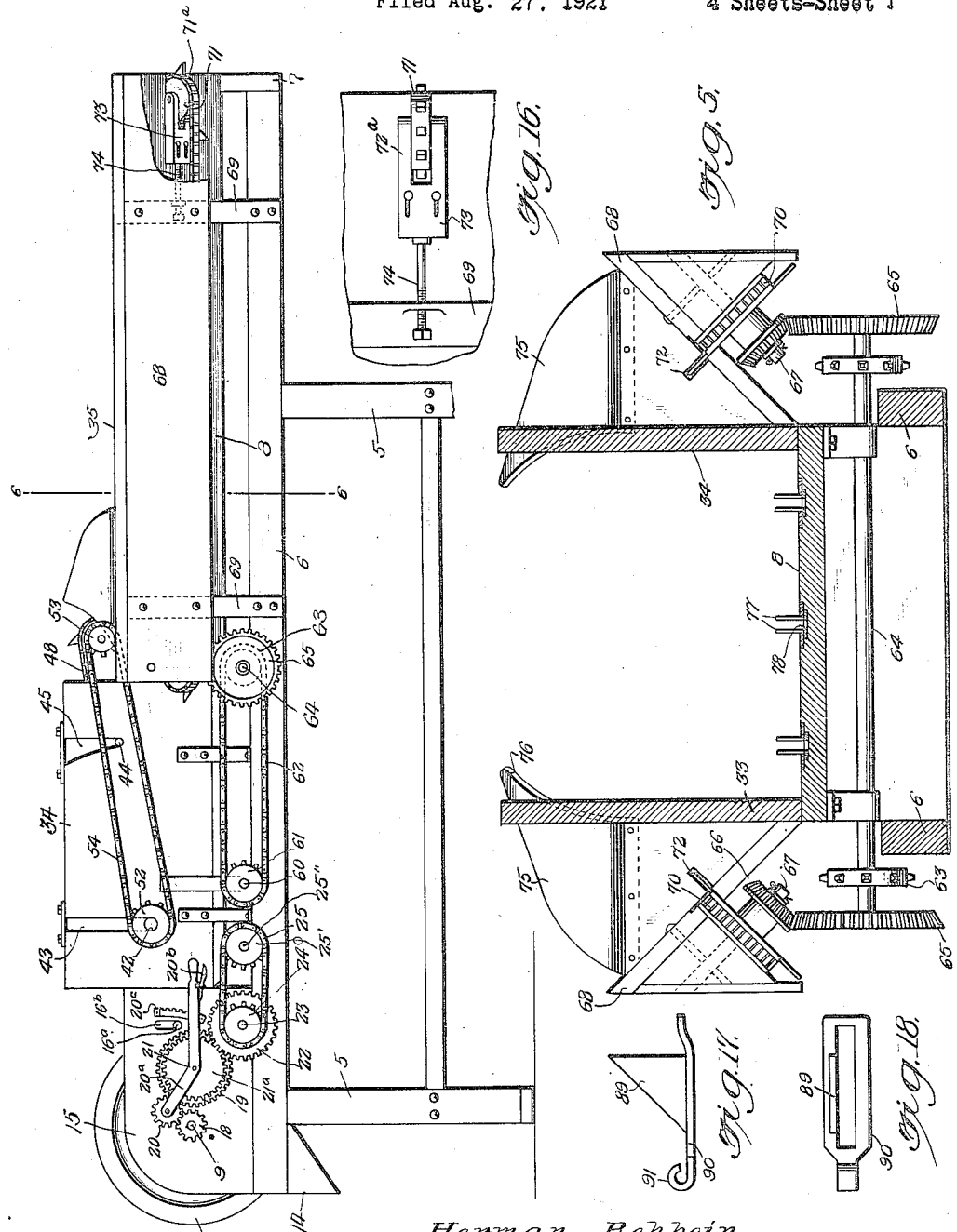

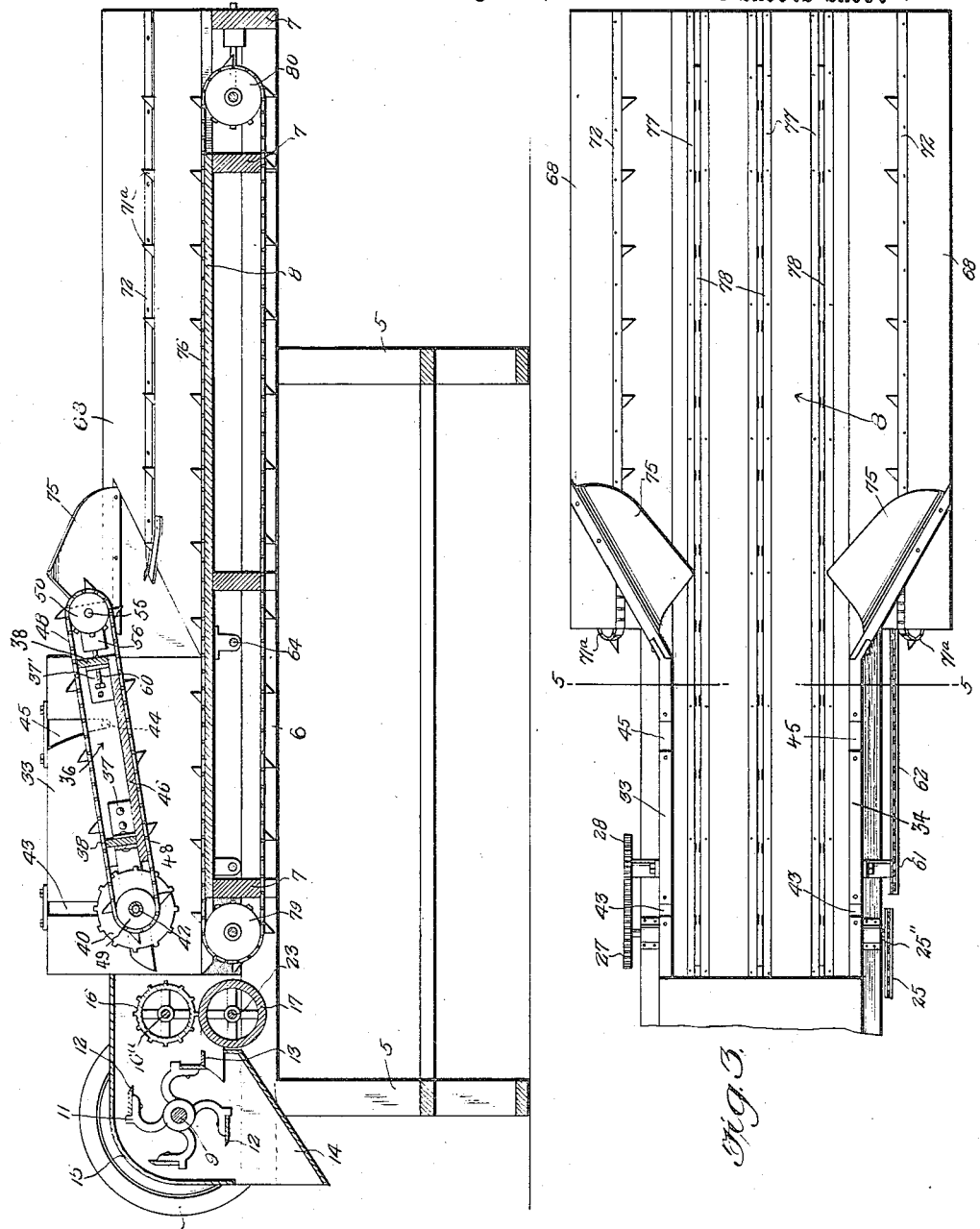

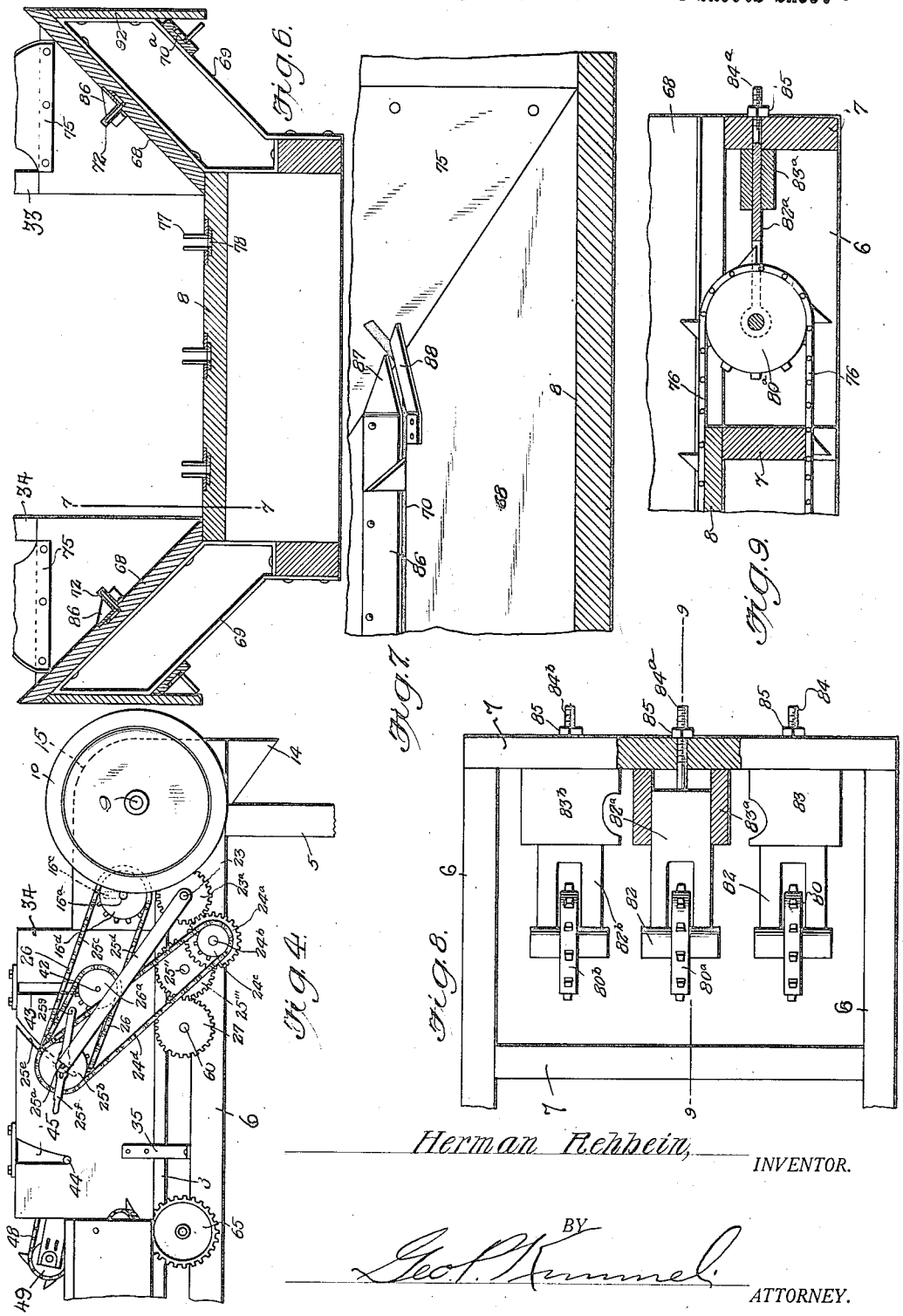

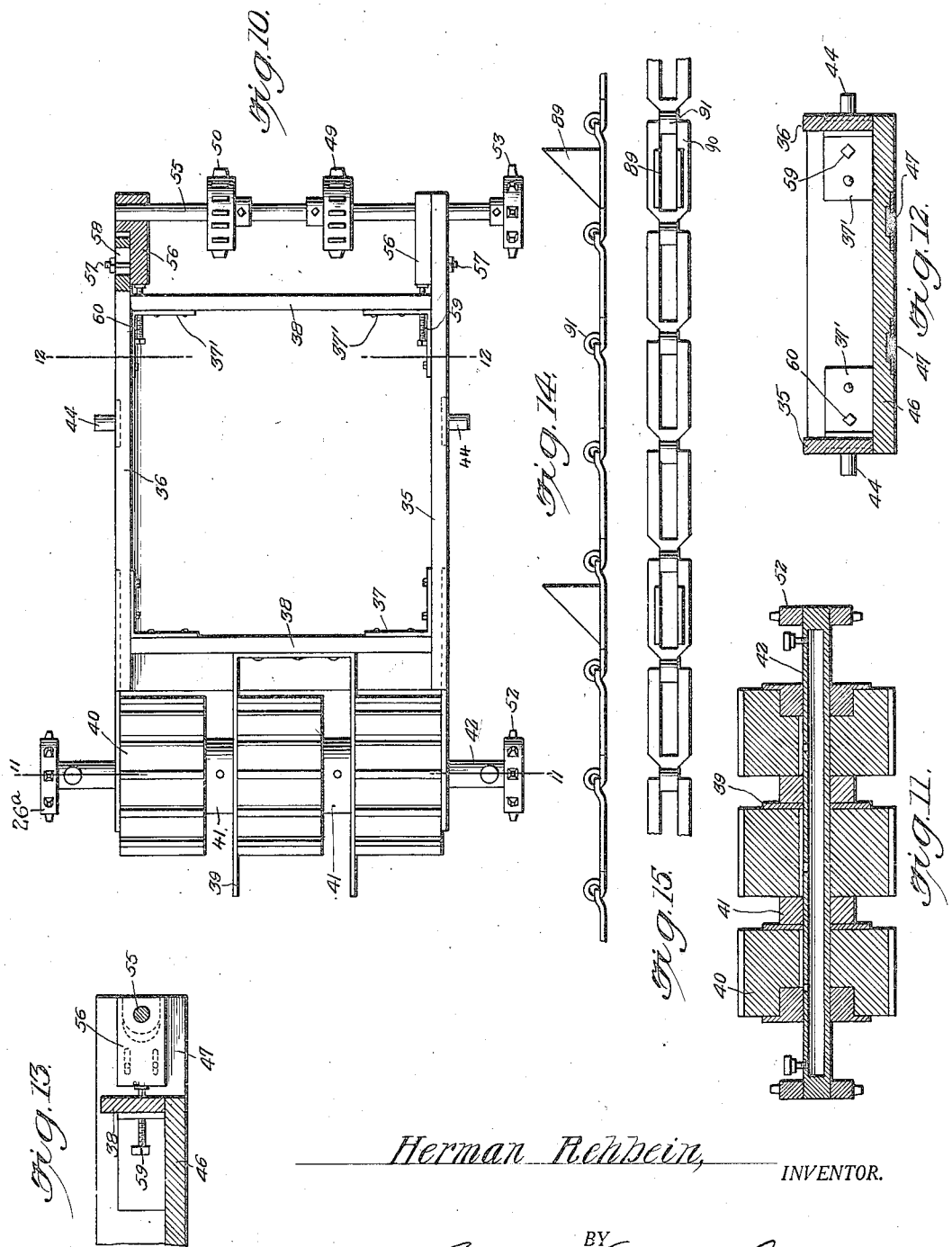

1,481,152

UNITED STATES PATENT OFFICE.

HERMAN REHBEIN, OF MISHICOT, WISCONSIN.

FORCE-FEED CUTTING MECHANISM.

Application filed August 27, 1921. Serial No. 496,143.

*To all whom it may concern:*

Be it known that I, HERMAN REHBEIN, a citizen of the United States, residing at Mishicot, in the county of Manitowoc and State of Wisconsin, have invented certain new and useful Improvements in Force-Feed Cutting Mechanism, of which the following is a specification.

This invention relates to improvements in self feeders or conveyers for ensilage and silo cutters, and has for one of its objects the provision of an auxiliary feeder or conveying mechanism to assist in the delivery of the feed to the cutting knives.

Another object of the invention resides in the provision of a feed table having flare boards connected thereto and endless conveyers mounted on the flare boards cooperating and driven with the main endless conveyers of the feed table to effectively deliver the feed to the cutting mechanism.

Another object of the invention is the construction of a force feed mechanism of the class above set forth wherein a freely movable frame having feeding rollers mounted adjacent the compression rollers may accommodate itself to engage a greater or less amount of material to be fed to the cutting knives.

Another object of the invention resides in a force feed mechanism having flare boards including provision for mounting a pair of inwardly bent guards thereon whereby the material is discharged directly on the feed table and its endless conveyers and directly to the cutting mechanism.

Another object of the invention consists in a force feed conveying mechanism, the endless conveyer chains being free to vibrate, and including provision for deflecting and wiping the material carrying prongs or plates of the chains and consequently prevent clogging of the material during the operation of the mechanism.

Another object of the invention is the provision of a force conveying mechanism designed for use and adapted to be installed on various types of feed tables, and one in which the parts are extremely simple in construction, easily assembled, rigid and durable, highly efficient in operation and capable of being manufactured at a very low cost whereby its commercial possibilities are greatly enhanced.

I attain these objects in the accompanying drawings, wherein:

Figure 1 is a side view of a portion of the cutter and feeder, parts being broken away.

Figure 2 is a longitudinal section of the ensilage and silo cutter showing the feed table conveying mechanism and the flare board conveying mechanism associated therewith.

Figure 3 is a plan of the mechanism shown by Figures 1 and 2.

Figure 4 is a side view showing the cooperating gearing or driving mechanism for the endless conveyers.

Figure 5 is an enlarged transverse section taken on the line 5—5 of Figure 3.

Figure 6 is an enlarged transverse section on the line 6—6 of Figure 1.

Figure 7 is a detail section taken on the line 7—7 of Figure 6.

Figure 8 is a view, partly in section, showing the adjusting or tightening mechanism for the feed table conveying chains.

Figure 9 is a sectional view taken on the line 9—9 of Figure 8.

Figure 10 is a detached view partly in section of the feed compression frame.

Figure 11 is a sectional view taken on the line 11—11 of Figure 10.

Figure 12 is a section taken on the line 12—12 of Figure 10.

Figure 13 is a sectional detail of the shaft adjusting mechanism shown in Figure 10.

Figure 14 is a side view, and:

Figure 15 is a plan view of one of the conveyer chains.

Figure 16 is a detail view of the chain tightening mechanism for the flare boards.

Figures 17 and 18 are detail views of one of the links of the endless conveyer chains.

Referring now to the drawings wherein like parts designate corresponding parts throughout the several views, the main supporting frame comprises the usual standards or supports, longitudinal sills 6 and transverse connecting beams 7 which constitute a rigid supporting structure for the feed table 8 on which the material is thrown to be carried to the cutting mechanism.

The main drive shaft 9 having the usual fly wheel 10 may be driven from any external source of power to operate the revolving cutter 11 mounted on said shaft, the cutting knives 12 of which cooperate with a stationary cutter 13 for cutting the material fed thereto and delivering the same to the chute 14 of the casing 15 enclosing the said cutting mechanism so that the cut material may be subsequently conveyed to any suitable form of elevating mechanism (not shown) to a silo as is well understood.

Two feed and compression rollers 16, 17 are positioned immediately in front of the cutters and serve to compress and feed the material thereto. The shaft 9 has a spur gear 18 keyed on one of its ends and this gear is adapted to drive a larger spur gear 19 when the same are inter-meshed one with the other by means of an idler spur gear 20 which is movable into and out of meshing relation with the gear 18 through the medium of a hand lever 20$^a$. The large spur gear 19 is keyed on a stub shaft 21, which is supported in a suitable bearing (not shown) on the outer face of one of the sides of the apparatus, and drives the same for the rotation of a second spur gear 21$^a$ keyed thereon, which, in turn, drives an inter-meshing spur gear 22 keyed on the shaft 23 of the compression roller 17. The hand lever 20$^a$ is fulcrumed on the stub shaft 21, and is provided with a latch device 20$^b$ which is cooperative with a tooth segment rack 20$^c$ whereby to be secured in either of its operative or inoperative positions. The upper compression roller 16 is carried on a transversely extending shaft 16$^a$ which is journaled in parallel relation to and above the shaft 23 of the lower compression roller 17, and has its opposite ends supported in vertically slotted bearing ways 16$^b$ and 16$^c$ formed in the opposite sides of the apparatus.

At the opposite side of the apparatus, the driven shaft 23 of the lower compression roller 17 is provided with a spur gear 23$^a$ arranged in mesh with a second spur gear 24$^a$ which, in turn, drives its stub shaft 24$^b$ and a sprocket wheel 24$^c$ carried thereon. Power from the shaft 23 is transmitted through this gearing and sprocket to a distributor sprocket shaft 25$^a$ through the medium of a sprocket chain 24$^d$ connecting the sprocket 24$^c$ to a sprocket wheel 25$^b$. The distributor sprocket shaft 25$^a$ carries two sprocket wheels other than the sprocket wheel 25$^b$, and the same being connected, one, by means of a sprocket chain 25$^c$ to a sprocket wheel 16$^d$ keyed on the shaft 16$^a$ of the upper compression roller 16, and the other, by means of a sprocket chain 26 to a sprocket wheel 26$^a$ keyed on one end of the shaft 42 for driving the compression rollers 40. The distributor sprocket shaft 25$^a$ is journaled at its outer end in one end of a brace or radius rod 25$^d$ which is fulcrumed at its other end on the shaft 23 of the lower compression roller 17, while the opposite end of the shaft 25$^a$ is carried in a curved bearing slotway 25$^e$ in one of the vertical sides of the feed table of the apparatus, which arrangement allows for the tightening or loosening up of the several sprocket chains 24$^d$, 25$^c$ and 26 as may be desired or necessary, and the proper adjustment of the shaft 25$^a$ for such purpose is obtained through the medium of a hand lever 25$^f$ which pivotally engages the latter at a point intermediate its ends and has its inner end fulcrumed as at 25$^g$ to the said side wall of the apparatus.

The shaft 23 of the lower compression roller 17 is further provided with a sprocket wheel 24 which, through the medium of a sprocket chain 25, drives a sprocket wheel 25' keyed on a transversely extending shaft 25'', which, in turn, has a spur gear 25''' keyed on its other end and arranged in mesh with a second spur gear 27 carried on the drive shaft 60 of the carrying mechanism of the material compression frame to be hereinafter described.

The feed compression frame heretofore mentioned comprises parallel side bars 35, 36 suitably connected by L-shaped braces 37 and 37' to a cross beam 38 which carries a U-shaped frame 39 for supporting the intermediate portion of the shaft 42 of the corrugated compression rollers 40 thereon, said rollers being spaced by suitable collars 41 on the shaft 42 as shown in Figures 10 and 11. The said shaft 42 is loosely carried and supported in slots 43 formed in the sides 33, 34, studs 44 extending outwardly from the sides of the compression frame being also provided with and adapted to be positioned in the slots 45 in the front of the sides 33 and 34 whereby the entire compression frame may oscillate and conform to the quantity of material being fed to the cutting mechanism. The floor 46 of the compression frame is provided with slots 47 in the bottom thereof to receive the conveying chains 48 trained over the sprockets 49, 50 and collars 41, being driven by the sprockets 52, 53 and sprocket chain 54 connected thereto also operating the corrugated rollers 40 in the manner above set forth. The shaft 55 carrying the sprocket wheels 49, 50, is carried by the end blocks 56, said blocks being provided with bolts 57 extending through slots 58 in the sides of the compression frame and are adjustable by means of the threaded screws 59, 60 of the cross connecting beam 38 as clearly shown by Figures 10 and 12 of the drawing.

Referring now to Figs. 1 and 5 in particular, it will be observed that the shaft 60 has keyed thereon a sprocket 61 connected by a sprocket chain 62 which in turn drives the forward sprocket 63 and its shaft 64, whereby power is communicated to the conveying mechanism of the flare boards. The said shaft 64 is provided at its opposite ends with spur gears 65 each of which meshes with a beveled gear 66 disposed at an angle thereto and drives beveled gear 66 and sprocket 70 which turn on the stub shafts 67, the stub shafts being supported beneath flare boards 68 disposed at an angle of substantially 45° with respect to and at opposite sides of the feed table 8 and rigidly connected thereto by cast brackets 69 which also connect the flare boards with the sills of the main supporting structure.

Each stub shaft 67 also carries a sprocket 70 and endless conveyor chain 71ª which travels in a track or guide 72 on the flare boards and beneath the brackets 69 and in a suitable guide 70ª supported by said bracket, the said flare board conveying chain passing over an adjustable sprocket wheel 71 carried between the arms 72ª of a bearing 73, the latter being adjustable by a set screw 74 extending through the bracket 69 so that the boxing may be moved to the desired position and consequently tighten or loosen the chains as desired.

Disposed at one end of the flare boards, I have provided a pair of gradually tapered inwardly directed guards or deflecting plates 75 the ends 76 of which extend inwardly of the sides 33, 34 so that the material moving along the flare boards will be directed onto the feed table and beneath the material compression frame above referred to and thence to the cutting mechanism.

The upper stretches of the conveying chains 76, there being three in number, operate between the guides 77 and within the grooves 78 in the top of the feed table the same being trained over the sprockets 79, 80, as clearly shown in Figs. 2 and 9 of the drawing. The rear sprockets 80, 80ª and 80ᵇ are journalled in individual bearings 82, 82ª and 82ᵇ, respectively, as shown in Figure 8, which are adjustably supported in guide boxings 83, 83ª and 83ᵇ for the purpose of effecting a tightening or loosening up of the conveying chains 76, the adjustment being accomplished through the medium of threaded rods 84, 84ª and 84ᵇ projecting from the free ends of the bearings 82, 82ª and 82ᵇ and outwardly of the adjacent transverse bar of the supporting frame, the free ends of the rods being threaded for the reception thereof of adjusting nuts 85.

Referring in particular to Fig. 7, it will be observed that the metallic strip 86 secured on each flare board and adjacent the groove therein has its bent end 87 disposed at an angle and cooperating with a resilient finger 88 whereby the endless chain operating in the groove 70 will be deflected sufficiently to permit the triangular shaped prongs or plates 89 of the links 90 to free themselves from the material being carried, each of said links being formed with an eye 91 for connection to the next adjacent link, thus permitting a certain amount of vibration of the links of the chain during the operation of the mechanism. Of course, only certain of the links are provided with the plates 89 and the endless chains are so mounted and operable in the grooves that should the chains break at any point they will fall through the supporting frame and will not be carried to the cutting mechanism, one of the common objections to similar devices of this character now being used.

The flare boards 68 are also provided with vertical sides or guards 92 whereby the conveying chains of the flare boards are protected and concealed from view as clearly suggested by Fig. 6 of the drawing.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the U. S. is:—

1. A device of the class described comprising a support, a feed table and flare boards attached thereto mounted on said support and endless conveying chains operable over the feed table and flare boards for conveying material to a cutting mechanism.

2. A device of the class described comprising a support, a feed table and flare boards attached thereto mounted on said support, inwardly bent deflecting members at the forward end of the flare boards for directing material to the feed table and endless conveying chains operable over the feed table and flare boards for conveying the material to a cutting mechanism.

3. A device of the class described comprising a support, a feed table and flare boards attached thereto mounted on said support, inwardly bent, tapering deflecting members secured at the forward end of the flare boards for directing material to the feed table, endless conveying chains operable in grooves in the bottom of said feed table and flare boards for conveying material to a cutting mechanism.

4. A device of the class described comprising a support, a feed table and flare boards attached thereto mounted on said support, conveying chains having material gripping plates carried thereby operable over the feed table and flare boards, and means for deflecting the gripping plates on the flare board chains and releasing the same from the material carried thereby at a point in advance of the cutting mechanism.

5. A device of the class described comprising a support, a feed table and flare boards attached thereto mounted on said support, inwardly bent deflecting members secured at the forward end of the flare boards for directing material to the feed table, conveying chains having gripping plates operable over the said feed table and flare boards, means for releasing the said gripping plates from the material on the flare boards at a point adjacent the deflecting members and in advance of a cutting mechanism.

6. A device of the class described comprising a support, a feed table and flare boards attached thereto mounted on said support, endless conveying chains operable over the feed table and flare boards, and cooperating gearing for driving said conveying chains.

7. A device of the class described comprising a support, a feed table and flare boards attached thereto mounted on said support, endless conveying chains operable over the feed table and flare boards, means for adjusting the tension on said conveying chains, and cooperating gearing for driving said chains.

8. A device of the class described comprising a feed table having flare boards attached thereto, endless conveyors operable in grooves in the bottom of the feed table and flare boards, and rearwardly and inwardly curved deflectors secured to the flare boards above the grooves therein for directing material to the feed table at a point in advance of the cutting mechanism.

9. A device of the class described comprising a feed table having flare boards attached thereto, endless conveyors operable in grooves in the bottom of the feed table and flare boards, means for tensioning said endless conveyors, rearwardly and inwardly curved deflectors secured to the flare boards above the grooves therein for directing material to the feed table, and cooperating gearing for operating the endless conveyors over the table and flare boards.

10. A device of the class described comprising a support, a feed table and flare boards attached thereto mounted on said support, endless conveyor chains operable over the feed table and flare boards, an oscillating material compression frame carried by said support in advance of the flare boards, feed rollers carried by said compression frame, and means for deflecting conveyed material from the flare boards beneath the rollers.

11. A device of the class described comprising a support, a feed table and flare boards attached thereto mounted on said support, adjustable endless conveyor chains operable over the feed table and flare boards, an oscillating compression frame having corrugated feed rollers carried by said support in advance of the flare boards and means attached to said flare boards for directing the conveyed material beneath the frame and its corrugated rollers.

12. A device of the class described comprising a support, a feed table and flare boards attached thereto mounted on said support, adjustable endless conveyor chains operable over the feed table and flare boards, an oscillating compression frame having corrugated feed rollers and endless conveyors supported in advance of the flare boards, means attached to said flare boards for directing the conveyed material beneath the frame and its roller and gearing for operating the respective endless chains of said feed table, flare boards and oscillating frame.

13. A device of the class described comprising a support, a feed table and flare boards attached thereto mounted on said support, adjustable endless conveyor chains operable over the feed table, adjustable conveyor chains operable over the flare boards, cooperating gearing for driving the respective chains, a vertically adjustable oscillating compression frame having spaced, feed rollers and a plurality of adjustable conveyor chains and gearing for driving the last mentioned chains, inwardly and rearwardly extending deflecting members for directing the conveyed material beneath the oscillating frame at a point considerably in advance of the rollers carried thereby.

14. A feeding device comprising a feeder having upwardly and outwardly converging side guide rails, main conveyor means mounted longitudinally of said feeder, and lateral endless conveyors mounted outwardly and upwardly of said main conveyor for cooperative movement therewith to forward a load of grain.

In testimony whereof, I affix my signature hereto.

HERMAN REHBEIN.